US005579249A

United States Patent [19]
Edwards

[11] Patent Number: 5,579,249
[45] Date of Patent: Nov. 26, 1996

[54] SYSTEM FOR MODELING AN INTEGRATED CHIP PACKAGE AND METHOD OF OPERATION

[75] Inventor: Darvin R. Edwards, Garland, Tex.

[73] Assignee: Texas Instruments Incorporated, Dallas, Tex.

[21] Appl. No.: 146,665

[22] Filed: Nov. 1, 1993

[51] Int. Cl.$^6$ .................................................. G06F 17/50
[52] U.S. Cl. ........................ 364/578; 364/488; 364/489; 364/490
[58] Field of Search .................................. 364/488–491, 364/578, 505, 506, 512, 550, 508

[56] References Cited

U.S. PATENT DOCUMENTS

| | | | |
|---|---|---|---|
| 4,797,842 | 1/1989 | Nackman et al. | 364/578 |
| 4,841,479 | 6/1989 | Tsuji et al. | 364/900 |
| 4,969,116 | 11/1990 | Wada et al. | 364/578 |
| 5,029,119 | 7/1991 | Konno | 364/578 |
| 5,214,752 | 5/1993 | Meshkat et al. | 395/123 |
| 5,282,140 | 1/1994 | Tazawa et al. | 364/468 |
| 5,307,296 | 4/1994 | Uchida et al. | 364/578 |
| 5,315,537 | 5/1994 | Blacker | 364/570 |
| 5,442,569 | 8/1995 | Osano | 364/578 |

OTHER PUBLICATIONS

Machine Design; vol. 63, No. 8; Apr. 23, 1992; Cleveland, US; pp. 65–69;'So You Want To Do A Little Electrical Work'; Dvorak, Paul.

IEEE Spectrum; vol. 28, No. 11; Nov. 1991; US; pp. 34–37; 'Simulating EM Fields'; Swanson Jr. et al.

Fifth Annual IEEE Semiconductor Thermal And Temperature Measurement Symposium; Feb. 7, 1989; US; pp. 59–62; 'finite element thermal analysis of 144 pin plastic flat packs'; Cooke et al.

Toute L'Electronique; No. 548; Nov. 1989; Paris, France; pp. 78–84; 'la cao au service du packaging electronique'; Lefevre, François.

DiOrio et al., "Material Effects on the Performance and Reliability of High-Power Molded Dual-In-Line Packages," 38$^{th}$ Annual Conference on Electronic Components, 1988, pp. 406–410.

Yeh et al., 'Correlation of Analytical and Experimental Approaches to Determine Thermally Induced PWB Warpage,' IEEE Trans. on Components, Hybrids, and Manufacturing Technology, vol. 16, No. 8, Dec. 1993, pp. 986–995.

Cooke et al., "Finite Element Thermal Analysis of 144 Pin Plastic Flat Packs," Fifth IEEE Semi-Therm™ Symposium, 1989, pp. 59–62.

Schroen et al., "Finite Element Analysis Application to Semiconductor Devices," 1988 IEEE/AESS Dayton Chapter Symposium, pp. 35–46.

Primary Examiner—Kevin J. Teska
Assistant Examiner—Leigh Marie Garbowski
Attorney, Agent, or Firm—W. Daniel Swayze, Jr.; W. James Brady, III; Richard L. Donaldson

[57] ABSTRACT

A system for modeling an integrated chip package and a method of operation is disclosed that includes a parametric processor (1) that provides parameters to define the parts of the package to a volume generator (2). The volume generator (2) uses the parameters to create volumes associated with each part of the integrated chip package. The system (3) provides the volume coordinates to a mesh generator (4). The mesh generator (4) further subdivides the volumes into elements, the elements being small enough for use in finite element analysis. The output of the mesh generator (4) is provided to a finite element analysis processor (5). The finite element analysis processor (5) conducts a physical stress or thermal stress analysis on the package using the elements created by the mesh generator (4). Once the finite element analysis processor (5) has completed its analysis of the package, the result is displayed on a display (6).

16 Claims, 4 Drawing Sheets

SYSTEM FOR MODELING AN INTEGRATED CHIP PACKAGE AND METHOD OF OPERATION

TECHNICAL FIELD OF THE INVENTION

This invention relates in general to the field of electronic systems and more particularly to improved systems and methods for modeling an integrated chip package.

BACKGROUND OF THE INVENTION

In the field of integrated chip manufacturing, it is often useful to analyze potential chip package designs using finite element analysis. Finite element analysis consists of modeling a chip package and analyzing the model to determine the effects of physical and thermal stress on the package. Three-dimensional modeling is accomplished by first dividing the package into its separate parts and identifying from what material each part is manufactured. Each part is then divided into volumes, and the volumes are further subdivided into elements. Once the package has been meshed as a collection of small three-dimensional elements, the elements are used to conduct a finite element analysis of the package.

Two-dimensional modeling of a package is accomplished by taking a cross-section of the package and identifying the separate parts of the package in the cross-section. Each part is then subdivided into areas and those areas are further subdivided into elements. These elements comprise two-dimensional elements in contrast to the three-dimensional elements used with three-dimensional modeling. Similar to the three-dimensional analysis, the two-dimensional elements are used to conduct a finite element analysis of the package in two dimensions.

A finite element analysis processor takes each element of a modeled package and analyzes the effect of a boundary value field equation on it. Both two-dimensional and three-dimensional finite element analysis can analyze the effect of both physical and thermal stresses on the package. The result of a finite element analysis is to predict what the package will do when the package is constructed using the modeled structure.

SUMMARY OF THE INVENTION

A need has arisen for a system for modeling an integrated chip package and a method of operation that speeds the generation of volumes and makes efficient use of symmetry of a package.

In accordance with the present invention, a system and method for modeling an integrated chip package is provided that substantially eliminates or reduces the disadvantages and problems associated with prior modeling systems.

According to one embodiment of the present invention, a computer system for modeling an integrated chip package is provided that comprises a parametric processor and a volume generator.

According to a further embodiment of the present invention, a computer system for modeling an integrated chip package is provided that comprises a parameter acquisition device, a first storage for storing parameters, a symmetry-offset generator, a volume coordinates generator, a volume tester and a second storage for storing volume coordinates.

According to a further aspect of the present invention, a method of modeling an integrated circuit package using a computer system is provided comprising the steps of processing parameters and generating volume coordinates.

According to a further embodiment of the present invention, a method for modeling an integrated chip package using a computer system is provided comprising the steps of acquiring parameters, storing the parameters, generating a symmetry offset, generating volume coordinates, testing the volume coordinates, and storing volume coordinates.

BRIEF DESCRIPTION OF THE DRAWINGS

A more complete understanding of the present invention may be acquired by referring to the following description taken in conjunction with the accompanying drawings in which like reference numbers indicate like features and wherein:

FIG. 2a illustrates a block diagram of a second embodiment of the present invention;

FIG. 2b illustrates a block diagram of a third embodiment of the present invention;

FIG. 3a is a flow chart of the overall task organization of the method of operation of the present invention;

FIG. 3b is a flow chart of the process used to check for symmetry and to set the offset;

FIG. 3c is a flow chart of the process used to generate pin volumes;

FIG. 3d is a flow chart of the process used to create pin volumes;

FIG. 3e is a flow chart of the process used to test the created volumes; and

FIG. 3f is a flow chart of the create component volumes task;

DETAILED DESCRIPTION OF THE INVENTION

Several problems are associated with finite element analysis of an integrated circuit package. One problem is the time it takes to complete the analysis after all of the elements have been generated. One way of avoiding some of this processing time is to use symmetry in the package to cut down the number of elements that must be processed. Due to the use of the symmetry of the package, only a portion of the volumes must be entered by hand rather than all of the volumes. Thus, symmetry allows analysis time to be shortened by decreasing the number of volumes.

A second problem with finite element analysis of integrated circuit packages is the time it takes to generate the model. In generating the model, the volumes within the parts and the elements that subdivide the volumes must be created. This process of creating the model can be quite time consuming. Generally, the meshing of volumes into elements in a form usable for a finite element analysis is accomplished by a mesh generator. The subdivision of the parts of an integrated circuit package is usually created separately and prior to the meshing of the elements by the mesh generator. Of the two subdivision steps, the creation of volumes is manual and the most time-consuming.

Figure 1:
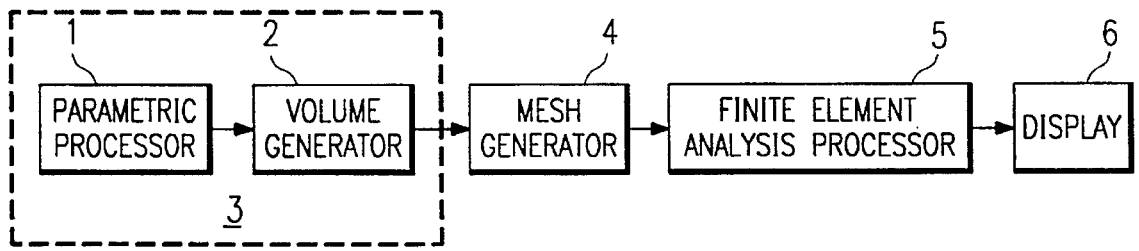
FIG. 1 illustrates a block diagram of a finite element analysis system, including one embodiment of the present invention.

The system of the present invention operates to create the volumes necessary for finite element analysis automatically by parametrically defining an integrated chip package to be modeled. Referring to FIG. 1, a parametric processor 1 is connected to a volume generator 2. Together, these two comprise a system for modeling an integrated circuit package 3. The volume generator 2 provides an input to a mesh generator 4. The output of the mesh generator 4 is provided to a finite element analysis processor 5 which then displays the result of the analysis on a display 6.

The parametric processor 1 operates by collecting values for a list of parameters from a user of the system 3. One example of a parameter that may be used to help model an integrated chip package is the pitch between the leads on the side of an integrated chip package. The parameters define the geometries of the integrated chip package to be modeled. The parametric processor 1 then stores the parameters for use by the volume generator 2. Many different lists of parameters can define the same package geometry. Different sets of parameters may be used to define the locations of the parts of a package as long as the parameters are sufficient to define the complete geometry of the package.

In operation, the volume generator 2 uses the parameters stored by the parametric processor 1 to calculate volume coordinates associated with the parts of the integrated chip package. The volume generator 2 selects a part of the package to be modeled, retrieves the parameters that define that part, and generates the volumes associated with that part. The volume generator 2 then moves to the next part, retrieves the stored parameters, and generates the volumes associated with the second part. The volume generator 2 continues until it has generated volumes for each of the parts of the integrated chip package as defined by the parameters acquired by the parametric processor 1 and has defined the subdivisions of the package. The volume generator 2 also links the material from which each part is to be manufactured with the parts volumes. The volume generator 2 then stores all of this information as a data set with points defining the volumes of each part of the package and data describing the materials of each part. This data set is provided as an input to the mesh generator 4.

According to one embodiment of the computer system of the present invention checks are placed into both the parametric processor 1 and the volume generator 2 to prevent the user from defining a package that is nonstandard. In the illustrated embodiment, no checks are included to allow the user to create whatever package structure is desired. Nevertheless, it is possible to place checks in the system 3 to prevent the user from creating non-standard or non-working packages.

In operation, the mesh generator 4 takes the stored data set produced by the volume generator 2 and meshes the volumes into elements. The volumes generated by the volume generator 2 are not small enough for an effective finite element analysis. The mesh generator 4 subdivides the volumes generated by the volume generator 2 into smaller elements and associates with the elements all necessary information for a finite element analysis. The mesh generator 4 then provides the mesh of smaller elements to the finite element processor 5.

The finite element analysis processor 5 uses the output of the mesh generator 4 to analyze the integrated chip package. The finite element analysis processor 5 analyzes the effect of physical stress or thermal stress placed on the package for a period of time and computes the result of those stresses. The finite element analysis processor 5 looks at each of the elements defined by the mesh generator 4, analyzes the effect of thermal or physical stress on each of the elements and computes the effect of the stresses on the overall structure. Once the finite element analysis processor 5 has analyzed the package with respect to the stresses placed on it, the finite element analysis processor 5 outputs the result to the display 6.

The display 6 displays the results of the finite element analysis in a form that can be readily understood by the user. In one embodiment, the display 6 is a video display operable to represent temperature and stress values by using different shades or colors. The display may comprise any form of display that conveys the results computed by the finite element analysis processor 5.

Figure 2A:
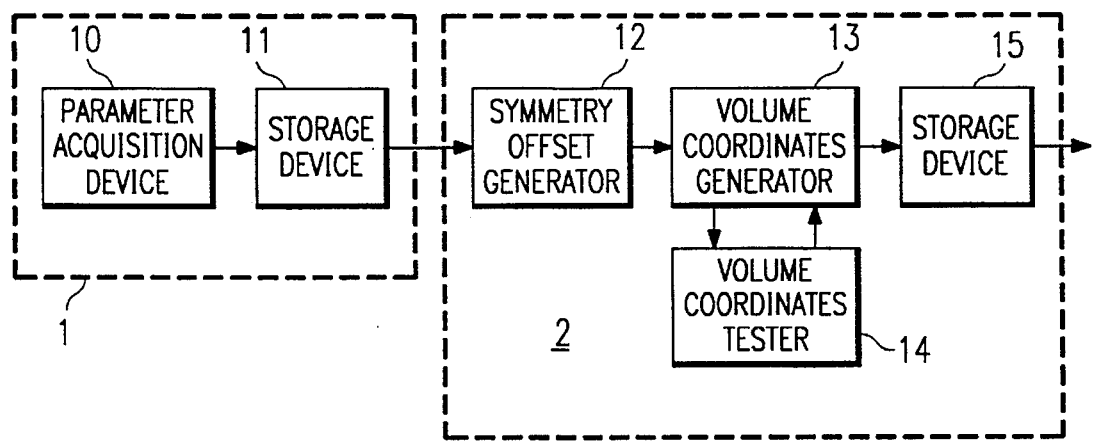
FIGS. 2a–2b illustrate block diagrams of additional embodiments of the present invention.

Referring to FIG. 2a, one embodiment of the present invention is shown. The parametric processor 1 comprises a parameter acquisition device 10 which is connected to a storage device 11. The volume generator 2 comprises a symmetry offset generator 12 which takes the parameter list from the storage device 11 in the parameter processor 1. The symmetry offset generator 12 is connected to a volume coordinates generator 13. The volume coordinates generator 13 is connected to a volume coordinates tester 14 and a storage device 15. In operation, the parameter acquisition device 10 acquires the values for a list of parameters from the user of the system 3. The parameter acquisition device 10 then provides the parameter list to the storage device 11. The storage device 11 stores the parameter list and provides the parameter list to the volume generator 2. The symmetry offset generator 12 checks the parameters obtained from the storage device 11 to determine what type of symmetry the model will have. The symmetry offset generator 12 then generates an offset according to the type of symmetry of the model. Once the offset has been set, the volume coordinates generator 13 looks to the parameter list and generates volumes associated with each of the parts of the integrated circuit package with a symmetry offset. Once it generates volume coordinates for a volume, the volume coordinates generator 13 sends the volume coordinates to the volume coordinates tester 14. The volume coordinates tester 14 then tests to decide which of the volumes generated by the volume coordinates generator 13 should be saved for later use by the mesh generator 4. After testing the volumes, the volume coordinate tester 14 returns control to the volume coordinates generator 13. This loop is reiterated until the volume coordinates generator 13 has generated volume coordinates for all of the volumes within the parts of the integrated circuit package. After it has generated all of the volumes, the volume coordinates generator 13 stores the volume coordinates in the storage device 15. The storage device 15 provides the volume coordinates to the mesh generator 4.

Figure 2B:
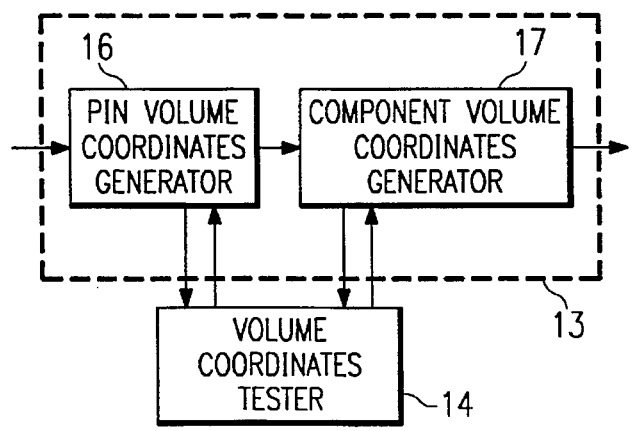

Referring to FIG. 2b, an alternate embodiment of the present invention is shown. The embodiment of FIG. 2b is the same as that of FIG. 2a except for the volume coordinates generator 13. FIG. 2b shows the volume coordinates generator 13 containing a pin volume coordinates generator 16 connected to a component volume coordinates generator 17. Both are connected to the volume coordinates tester 14. In operation, the pin volume coordinates generator 16 generates the volumes for the pins of the integrated circuit package. These volumes are then tested by the volumes coordinates tester 14 as described above. Once all of the pin volumes have been generated, the system moves to the component volume coordinates generator 17. The component volume coordinates generator 17 generates volumes for the components of the integrated circuit package. These components are the parts of the integrated chip package other than the pins. They might include such parts as, for example, the printed wiring board, the chip, the die attach, the pad, the tie straps and the mold compound. The component volume coordinates generator 17 generates volumes within each of these components and sends them to the volume coordinates tester 14 for testing as described above. After all of the volumes have been generated within the components, the system stores the volume coordinates for the entire integrated chip package in the storage device 15.

Figure 3A:
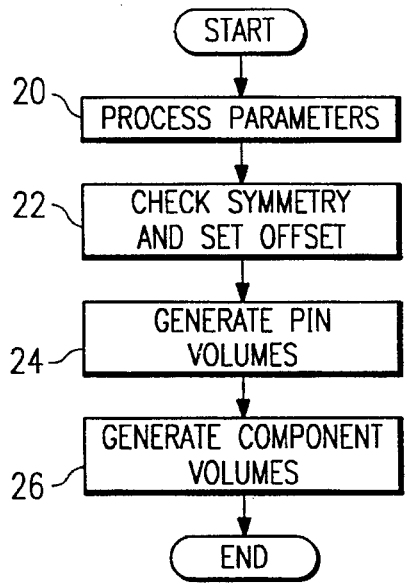
FIGS. 3a–3f illustrate flow charts of the method of modeling according to the present invention.

Referring to FIG. 3a, a method of operation of the present invention begins by processing parameters in step 20. The parameters describe the geometry of the integrated circuit package. Values for the parameters are acquired from the user, and the system stores them for use in modeling the package. In step 22, the system checks the type of symmetry acquired as a parameter from the user and sets a symmetry offset accordingly. The operations performed to accomplish step 22 are illustrated in greater detail in FIG. 3b. After setting the offset, the system generates pin volumes in step 24. Step 24 is illustrated in greater detail in FIG. 3c. After the system has generated all of the pin volumes, the system proceeds to step 26 and generates component volumes. The components of the package are those parts of the package other than the pins. The generation of the component volumes in step 40 is illustrated in FIG. 3f.

One advantage of the present invention is the parametric approach to defining the parts of an integrated chip package. The number of parameters must be enough to define all of the parts of the package. The parameters are sufficient as long as each part is defined. There is a broad range of parameter lists that work to define an integrated chip package. Parametric processing allows the user to change parameter values and thus change the geometries of the package to be modeled. By changing a parameter, the user defines a different geometry for the parts of the package which in turn causes different volumes within each part to be generated. Therefore, it is possible for the user to model any package type regardless of whether it is standard or has been previously created in a library. This automation provides speed and flexibility. The user does not have to recreate volumes manually, volume by volume, to create a new package model. The volumes are generated automatically from the parameters.

The list of parameters used by one exemplary embodiment of the present invention are shown in the following Table One:

TABLE ONE

| | |
|---|---|
| PWB thickness | Tie strap width |
| PWB length | PWB to package bottom |
| PWB width | Shoulder length |
| Chip thickness | PWB trace length |
| Chip length | PWB trace thickness |
| Chip width | PWB backpin thickness |
| Package thickness | No. of leads on a width side |

TABLE ONE-continued

| | |
|---|---|
| Package length | No. of leads on a length side |
| Package width | Shoulder lead width |
| Pad thickness | Shoulder lead space |
| Pad length | Shoulder to PWB distance |
| Pad width | Foot width |
| Die attach thickness | Foot length on PWB |
| Leadframe downset | Board to neckdown |

Figure 3B:
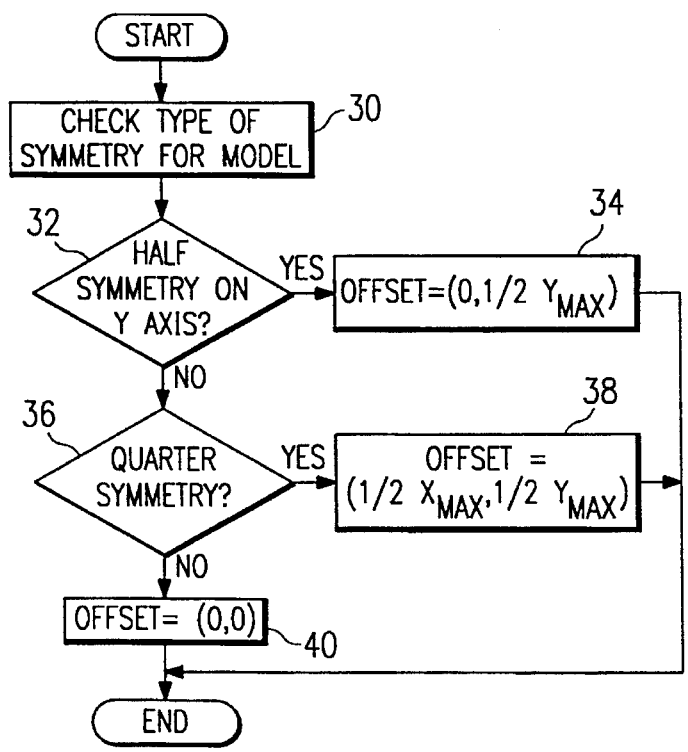
Figure 3C:
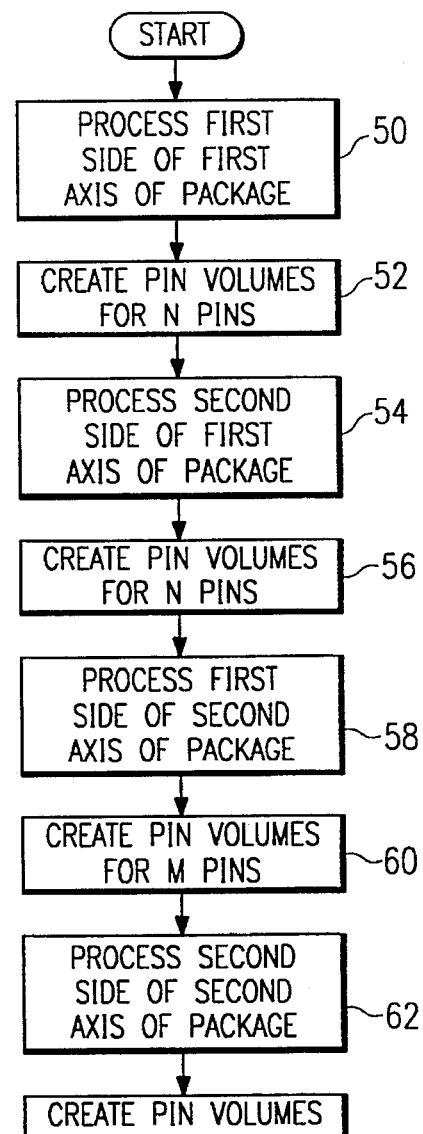

FIG. 3b illustrates the method of the present invention used by the system to check the symmetry of the model and to set the symmetry offset. In step 30, the system checks the type of symmetry for the model according to the parameters for the package acquired in step 20. In step 32, the system checks whether the model has half-symmetry on the y axis. If so, the system moves to step 34 and sets a symmetry offset to $$\left( 0, \frac{1}{2} y_{max} \right),$$

where $y_{max}$ is the maximum y value of the model. In one embodiment of the present invention, the symmetry used for half-symmetry is symmetry about the y axis. This could be symmetry about the x axis as well. Merely as a convention, this embodiment uses the y axis for half-symmetry. If in step 32, half-symmetry on the y axis has not been indicated by the parameters, the system continues to step 36. In step 36, the system checks whether quarter-symmetry is indicated. If so, then the system moves to step 38 and sets the symmetry offset to $$\left( \frac{1}{2} x_{max}, \frac{1}{2} y_{max} \right),$$

where $y_{max}$ is the maximum y value and $x_{max}$ is the maximum x value of the model. If, in step 36, quarter-symmetry has not been indicated, then the system continues to step 40. In step 40, the system sets the symmetry offset to (0,0) because the model is to be generated with full symmetry. Although the illustrated embodiment of the present invention uses only half-symmetry, quarter-symmetry or full symmetry, it is possible to use other symmetries of the package. The task illustrated in FIG. 3b is completed once the system has set the symmetry offset.

Figure 3D:
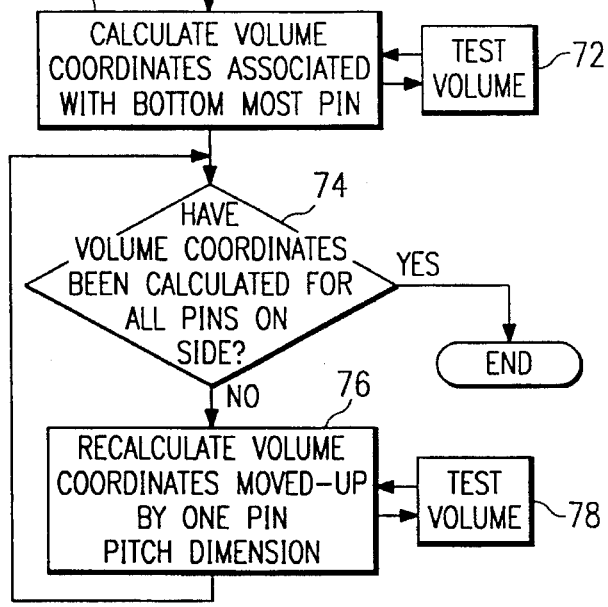

The system first operates on the first side of the first axis of the package in step 50. In one embodiment of the present invention, the first side is the positive x side, and the first axis is the y axis of the package. In this embodiment, the package sits in the x-y plane with the z axis defining the depth or height of the package. After step 50, with the system operating on the first side of the first axis of the package, the system creates pin volumes in step 52 for N pins as specified by the parameters defining the package. The step 52 of creating pin volumes for the N pins along the first side of the first axis of the package is illustrated in FIG. 3d. After creating the pin volumes for the N pins on the first side of the first axis of the package, the system moves to the second side of first axis of the package in step 54. Similar to step 52, the system creates pin volumes for N pins on the second side in step 56. This step 56 of pin volumes creation is also illustrated in FIG. 3d. Steps 54 and 56 are performed the same except that the system has moved to a different side of the first axis of the package.

The system then proceeds to operate on the first side of the second axis of the package in step 58 after having completed the first axis of the package. In one embodiment of the present invention, the second axis is the x axis, and the first side of the second axis is the positive y side of the package. After moving to the first side of the second axis of the package, the system creates pin volumes for M pins in step 60. The number of pins M to be created on a side along the second axis of the package is a parameter also acquired by the system in step 20. The creation of pin volumes for the M pins along the first side of the second axis of the package is illustrated in FIG. 3d, as was the creation of pin volumes for the sides along the first axis. After the pin volumes for the first side of the second axis have been created in step 60, the system moves to the second side of the second axis of the package in step 62. In step 64, the system creates pin volumes for M pins along the second side of the second axis of the package. Again, this creation of pin volumes is illustrated in FIG. 3d. Because of the parameterization of the geometry of the package in the parametric processing step 20, the user of the system is free to set the number of pins along the first axis and the second axis of the package.

FIG. 3d illustrates the method used by the system to create pin volumes according to the teachings of the present invention. Regardless for which side or axis pin volumes are presently being created, the pin volumes are created according to the method of FIG. 3d. The system first calculates the volume coordinates associated with the bottommost pin in step 70. Once the volume coordinates for a first volume associated with the bottommost pin has been created, the system moves to step 72 and tests that volume. The testing of volumes is described in FIG. 3e. Generally, a volume is tested in step 72 to determine which volumes will be saved and which will not be saved due to the symmetry of the model. After the system has tested a volume in step 72, the system returns to step 70. If more volumes are to be created for the bottommost pin, the system calculates volume coordinates and moves to step 72 and tests the new volume until all volumes are created. After all volumes associated with the bottommost pin are created, the system continues to step 74. The system checks, in step 74, whether volume coordinates have been calculated for all of the pins on the side. For example, if the system is creating pin volumes for the first side of the first axis, N pins need to be created. In step 74, the system would check whether N pins have been created for that side. If N pins have been created, the system has completed creating pin volumes. If N pins have not been created, then the system moves to step 76. In step 76, the system recalculates the volume coordinates incremented by one pin pitch dimension. The pitch dimension is the distance between like points on two adjacent pins. Because all of the pins on a side are the same size, successive pins after the bottommost pin can be defined by using the pitch dimension. The next pin volumes are created by adding the pin pitch dimension to the appropriate coordinates of the bottommost pin. After the system recalculates volume coordinates incremented by one pin pitch dimension in step 76, the system moves to step 78 to test each volume associated with the next pin. After all the volumes associated with the next pin have been calculated in step 76, the system again checks in step 74 to determine if all pin volume coordinates have been calculated. If so, the system has completed the present side. If all of the pin volume coordinates have not been calculated for the present side, then the system continues to step 76, and recalculates the volume coordinates again by moving up one pin pitch dimension. The system operates in this loop, testing each volume in step 78, checking if further volumes need to be created in step 74 and recalculating pin volume coordinates in step 76 until all of the pins for the present side have been created.

Figure 3E:
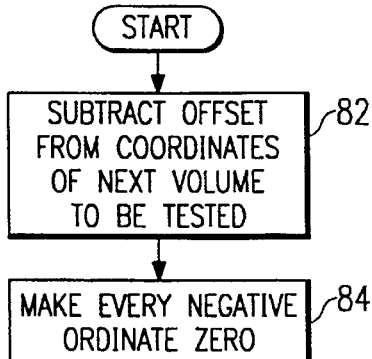
Figure 3F:
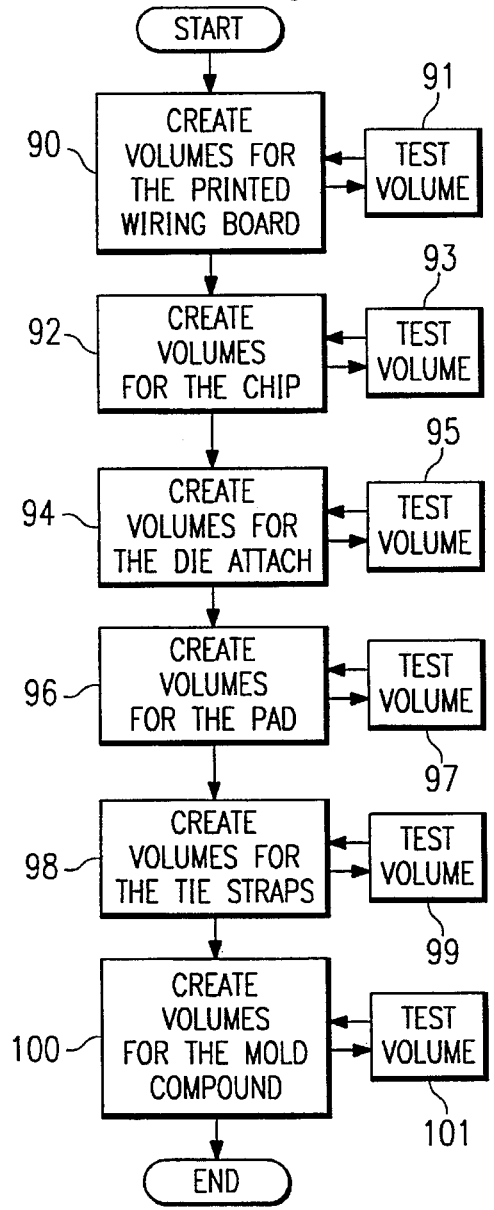

Referring to FIG. 3e, the system tests volumes according to the method shown. In step 82, the system subtracts the symmetry offset from the coordinates of the volume being tested. For example, if the symmetry offset were $$\left(0, \frac{1}{2} y_{max}\right)$$

because the model had half-symmetry on the y axis, this offset would be subtracted from all of the coordinates of the volume being tested. After step 82, the system makes every negative coordinate of the volume coordinates equal to zero in step 84. In step 86, the system checks whether the volume being tested has a thickness in all directions greater then zero. If so, the system moves to step 88 and adds the volume to the list of volumes to be saved. If the volume does not have a thickness greater than zero in all directions, then the system does not add the volume to the list to be saved. Step 86 functions to check which volumes are within the symmetry of the model to be tested. For example, if a volume lies in the half of the y axis that is not going to be analyzed because there is half-symmetry on the y axis, subtracting the symmetry offset from the volume coordinates will make at least one of the volume coordinates negative. In step 84, the negative ordinates are made equal to zero. Thus, in step 86, that volume will not have a thickness in all directions greater than zero. Because it has a thickness that is not greater than zero, the volume is not added to the list because the volume is not in the half of the package to be tested. If, on the other hand, a volume is in the half of the package that will be tested under half-symmetry, subtracting the symmetry offset will not make any volume coordinates negative. Thus, in step 86, the volume will have a thickness in all directions greater than zero. The system will move to step 88 and add the volume to the list.

FIG. 3f illustrates the method used by the system of the present invention create component volumes. In step 90, the system creates the volumes associated with the printed wiring board. After volume coordinates are created for each volume associated with the printed wiring board in step 90, the system moves to step 91 and tests each volume. Each volume is tested according to the method shown in FIG. 3e as discussed above. Each volume is either added to the list or not added to the list, depending upon whether the appropriate symmetry is used and whether the volume lies within the portion of the package to be tested under the indicated symmetry. The system creates volumes associated with the chip in step 92. In step 93, the system tests each volume associated with the chip after it is created. The system creates volumes associated with the die attach in step 94 and tests each of those volumes in step 95 after each is created. In step 96, the system creates volumes associated with the pad. The system tests each of the volumes associated with the pad in step 97 after each is created. The system creates volumes for the tie straps in step 98 and tests each of those volumes in step 99 after each is created. In step 100, the system creates volumes for the mold compound. The system tests each of those volumes in step 101 after each is created.

Generally, the integrated chip package to be modeled will be composed of parts such as the pins, the printed wiring board, the chip, the die attach, the pad, the tie strips and the mold compound. The parts of the integrated chip package exist in fixed relationships to one another. The present invention uses the relationships between these parts to provide a parameter list that can be used to define the geometries of the package. Using the parameter list, the system generates the volume coordinates for all of the volumes within the parts of the package. It then stores all of the volume coordinates as a data set. This data set can then be used by a meshing program to subdivide the volumes into elements that are fed into a finite element analysis processor.

The present invention is also advantageous in generating two-dimensional models of integrated chip packages. In contrast to a three-dimensional model, a two-dimensional model is a model of a cross-section of an integrated chip package.

Figure 4:
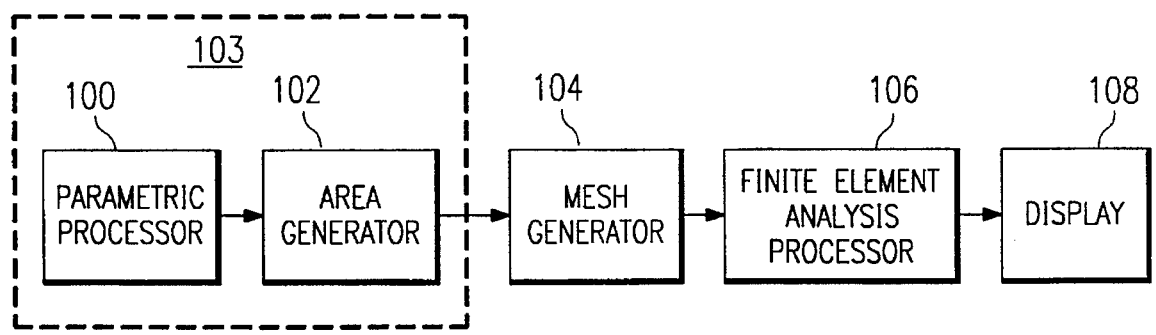
FIG. 4 is a block diagram of a two-dimensional finite element analysis system constructed according to the present invention.

Referring to FIG. 4, a block diagram is shown with a parametric processor 100 coupled to an area generator 102. Together, they constitute a computer system 103 for modeling an integrated chip package in two-dimensions. The area generator 102 is coupled to a mesh generator 104, which is coupled to a finite element analysis processor 106. The finite element processor 106 is coupled to a display 108. The parametric processor 100 defines the geometries of a package in two dimensions using the parameters that are acquired from the user of the system. These parameters are fed into the area generator 102 that generates areas within the parts of the two-dimensional package. The mesh generator 104 then subdivides the areas into elements and associates with the elements information necessary for finite element analysis. The output of the mesh generator 104 is used by the finite element processor 106 to analyze physical stress on the package. The finite element processor 106 shows the results on the display 108.

Figure 5:
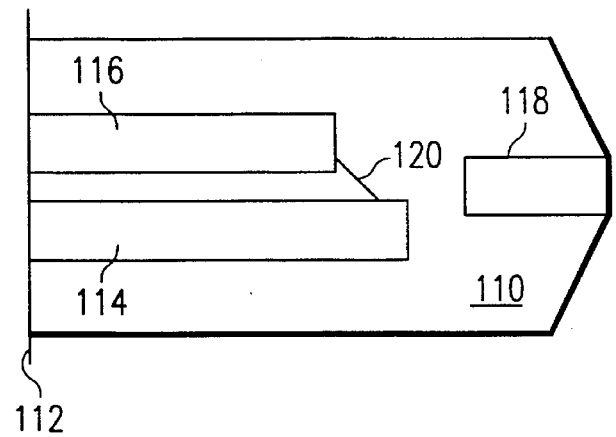
FIG. 5 is a two-dimensional view of a plastic package.

Referring to FIG. 5, a two-dimensional cross-section of a plastic integrated chip package is shown. The plastic package 110 has a centerline 112. The plastic package 110 contains a leadframe 114, a chip 116 and a die pad 118. A die attach 120 connects the chip 116 to the leadframe 114. As pictured in FIG. 4, a plastic integrated chip package has certain parts that can be defined relative to one another using a list of parameters. Table Two shows the list of parameters used by one embodiment of the present invention to describe the plastic package shown in FIG. 4.

TABLE TWO

Thickness of plastic below chip pad
Leadframe thickness
Leadframe downset
Die attach thickness
Chip thickness
Die attach fillet height above chip bottom
Ball bond contact area diameter
Distance from ball bond center to chip edge
Ball bond height
Ball bond wire diameter
Total package thickness
Chip centerline to chip edge distance
Pad centerline to pad edge distance
Die attach fillet length on pad
Distance from die pad to leadfingers
Package centerline to package edge distance
Slope offset These parameters are not the only parameters that could be used to define the plastic package model. They are only those chosen for this exemplary embodiment.

Figure 6:
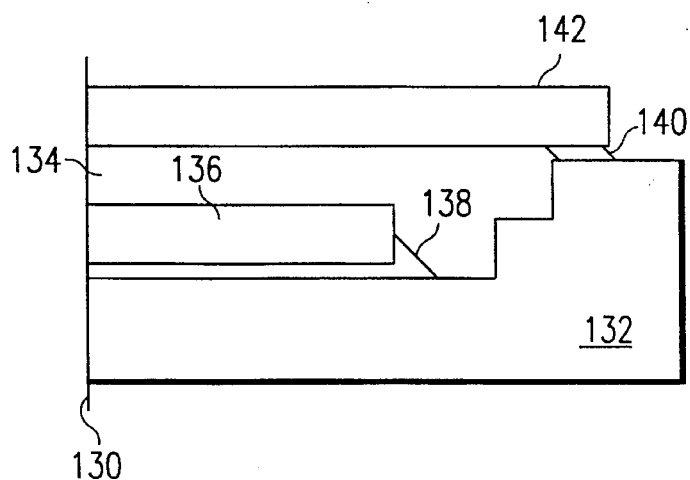
FIG. 6 is a two-dimensional view of a ceramic package.

Referring to FIG. 6, a two-dimensional cross-section is shown of a ceramic integrated circuit package. The ceramic package has a centerline 130 and a ceramic body 132. A cavity 134 is above the ceramic body 132. Inside the cavity 134, a chip 136 is attached to the ceramic body 132 by a die attach 138. A lid solder 140 attaches a lid 142 to the ceramic body 132. Similar to the plastic package, the ceramic package comprises certain parts which exist in certain relations to one another. As above, parameters define the relationships between these parts. The parameters used in one embodiment of the present invention are listed below in Table Three.

TABLE THREE

Ceramic thickness beneath chip
Die attach thickness
Chip thickness
Die attach fillet height above chip bottom
Center bond shelf height
Cavity depth
Chip centerline to chip edge distance
Die attach fillet length on pad
Cavity length to bond shelf or cavity
sidewall
Bond shelf length
Lid solder thickness
Lid length
Lid solder fillet length
Lid thickness
Package centerline to package edge distance
Edge void at end of chip
Mount void at center chip As above, these parameters are not the only ones that could be used to define the ceramic package. They are simply the ones chosen in this exemplary embodiment. By using these parameters, the parametric processor 100 describes the geometries of the package. The area generator 102 can then take the parameters and generate volumes within each of the parts. These volumes are further subdivided by a mesh generator 104 for use in a finite element analysis processor 106 with the results later displayed to the user.

One advantage of the present invention inheres in the fact that symmetry within a package to be modeled is described by the use of an offset. Symmetry does not consist solely by creating only half of a package or a fourth of a package. Symmetry is accomplished by using an offset universally with all volumes that are generated. This process frees the user to switch symmetry types and reduces analysis time. The user may switch to half-symmetry and reduce analysis time or switch back to full symmetry by changing the symmetry parameters in the parametric processor.

Another advantage of the present invention is that the volume generator uses only rectangular blocks to describe the volumes within the parts of the package. Because the volume generator uses blocks, the volume generator needs only to specify two points on each volume to define it. If the volume generator defines the (x,y,z) of diagonal points on the block, that block is adequately defined. This decreases the amount of data storage that is needed for the volume generator to store the volume coordinates it generates. Otherwise, the volume generator would have to store more points for every volume because of the fact that each volume could take a random shape, though the process described herein would be effective for such irregular volumes.

Although the present invention has been described in detail, it should be understood that various changes, substitutions and alterations can be made hereto without departing from the spirit and scope of the invention as defined by the appended claims.

What is claimed is:

1. A system for modeling an integrated chip package, comprising:

a parametric processor operable to acquire a plurality of parameter values for a plurality of parameters based on said integrated chip package and to obtain a symmetry offset based on said parameters, wherein the plurality of parameters defines spacial relationships between a plurality of parts of the integrated chip package; and a volume generator coupled to the parametric processor operable to generate a plurality of volume coordinates in accordance with said symmetry offset for a plurality of volumes associated with the plurality of parts of the integrated chip package by using the plurality of parameter values and to model the integrated chip package.

2. The system of claim 1, wherein the parametric processor comprises:
- a parameter acquisition device operable to acquire said plurality of parameter values for said plurality of parameters based on said integrated chip package; and
- a storage device coupled to the parameter acquisition device and to the volume generator and operable to store the plurality of parameter values.

3. A system for modeling an integrated chip package comprising:
- a parametric processor operable to acquire a plurality of parameter values for a plurality of parameters based on said integrated chip package, wherein the plurality o parameters define spacial relationships between a plurality of parts of the integrated chip package; and
- a volume generator coupled to the parametric processor operable to generate a plurality of volume coordinates for a plurality of volumes associated with the plurality of parts of the integrated chip package by using the plurality of parameter values, wherein the volume generator comprises:
  - a symmetry offset generator coupled to the parametric processor and operable to generate a symmetry offset, wherein the symmetry offset is generated using a model symmetry type acquired as one of the plurality of parameter values;
  - a volume coordinates generator coupled to the symmetry offset generator and operable to generate said plurality of volume coordinates for said plurality of volume coordinates associated with said plurality of parts of the integrated chip package using the plurality of parameter values;
  - a volume coordinates tester coupled to the volume coordinates generator and operable to test the plurality of volume coordinates and to create a list of volume coordinates for passing volumes, wherein a volume is a passing volume if the volume is included within a portion of the integrated chip package to be modeled with the model symmetry type; and
  - a storage device coupled to the volume coordinates generator and operable to store the list of volume coordinates for said passing volumes.

4. A system for modeling an integrated chip package comprising:
- a parametric processor operable to acquire a plurality of parameter values for a plurality of parameters based on said integrated chip package, wherein the plurality of parameters define spacial relationships between a plurality of parts of the integrated chip package; and
- a volume generator coupled to the parametric processor operable to generate a plurality of volume coordinates for a plurality of volumes associated with the plurality of parts of the integrated chip package by using the plurality of parameter values, wherein the volume generator comprises:
  - a symmetry offset generator coupled to the parametric processor and operable to generate a symmetry offset, wherein the symmetry offset is generated using a model symmetry type acquired as a parameter value;
  - a volume coordinates generator coupled to the symmetry offset generator comprising:
    - a pin volume coordinates generator coupled to the symmetry offset generator and operable to generate a plurality of volume coordinates for a plurality of volumes associated with a plurality of pins of the integrated chip package by using the plurality of parameter values;
    - a component volume coordinates generator coupled to the pin volume coordinates generator and operable to generate a plurality of volume coordinates for a plurality of volumes associated with a plurality of components of the integrated chip package by using the plurality of parameter values;
  - a volume coordinates tester coupled to the volume coordinates generator and operable to test the plurality of volume coordinates and to create a list of volume coordinates for passing volumes, wherein a volume comprises a passing volume if the volume is included within a portion of the integrated chip package to be modeled with the model symmetry type; and
  - a storage device coupled to the volume coordinates generator and operable to store the list of volume coordinates for the passing volumes.

5. A computer system for finite element analysis of an integrated chip package, comprising:
- a parametric processor operable to acquire a plurality of parameter values for a plurality of parameters based on said integrated chip package, wherein the plurality of parameters define spacial relationships between a plurality of parts of the integrated chip package;
- a volume generator coupled to the parametric processor and operable to generate a plurality of volume coordinates for a plurality of volumes associated with the plurality of parts of the integrated chip package by using the plurality of parameter values;
- a mesh generator coupled to the volume generator and operable to subdivide the plurality of volumes into a plurality of elements;
- a finite element analysis processor coupled to the mesh generator and operable to analyze a model of an integrated chip package by calculating an effect of stress on the plurality of elements;
- a display coupled to the finite element analysis processor and operable to display a result from the finite element analysis processor, wherein the parametric processor comprises:
  - a parameter acquisition device operable to acquire said plurality of parameter values for said plurality of parameters; and
  - a storage device which is coupled to the parameter acquisition device and to the volume generator and is operable to store the plurality of parameter values, wherein the volume generator comprises:
    - a symmetry offset generator coupled to the parametric processor and operable to generate a symmetry offset, wherein the symmetry offset is generated using a model symmetry type acquired as a parameter value;
    - a volume coordinates generator coupled to the symmetry offset generator, comprising:
      - a pin volume coordinates generator coupled to the symmetry offset generator and operable to generate said plurality of volume coordinates for said plurality of volumes associated with a plurality of pins of the integrated chip package using the plurality of parameter values;

a component volume coordinates generator coupled to the pin volume coordinates generator and operable to generate said plurality of volume coordinates for said plurality of volumes associated with a plurality of components of the integrated chip package by using the plurality of parameter values;

a volume coordinates tester coupled to the volume coordinates generator and operable to test the plurality of volume coordinates and to create a list of volume coordinates for passing volumes, wherein a volume is a passing volume if the volume is included within a portion of the integrated chip package to be modeled with the model symmetry type; and a storage device coupled to the volume coordinates generator and operable to store the list of volume coordinates for passing volumes.

6. A system for two-dimensional finite element analysis of an integrated chip package comprising:

a parametric processor operable to acquire a plurality of parameter values for a plurality of parameters and to obtain a symmetry offset based on said parameters, wherein the plurality of parameters defines spacial relationships between a plurality of parts of the integrated chip package; and an area generator coupled to the parametric processor and operable to generate a plurality of area coordinates in accordance with said symmetry offset for a plurality of areas associated with the plurality of parts of the integrated chip package using the plurality of parameter values;

a mesh generator coupled to the area generator and operable to subdivide the plurality of areas into a plurality of elements;

a finite element analysis processor coupled to the mesh generator and operable to analyze a model of an integrated chip package by calculating an effect of stress on the plurality of elements; and a display coupled to the finite element analysis processor and operable to display a result from the finite element analysis processor.

7. A computer system for finite element analysis of an integrated chip package, comprising:

a parametric processor operable to acquire a plurality of parameter values for a plurality of parameters based on said integrated chip package and to obtain a symmetry offset based on said parameters, wherein the plurality of parameters define spacial relationships between a plurality of parts of the integrated chip package; and a volume generator coupled to the parametric processor and operable to generate a plurality of volume coordinates in accordance with said symmetry offset for a plurality of volumes associated with the plurality of parts of the integrated chip package by using the plurality of parameter values;

a mesh generator coupled to the volume generator and operable to subdivide the plurality of volumes into a plurality of elements;

a finite element analysis processor coupled to the mesh generator and operable to analyze a model of a integrated chip package by calculating an effect of stress on the plurality of elements; and a display coupled to the finite element analysis processor and operable to display a result from the finite element analysis processor.

8. The computer system of claim 7, wherein the parametric processor comprises:

a parameter acquisition device operable to acquire said plurality of parameter values for said plurality of parameters; and a storage device which is coupled to the parameter acquisition device and to the volume generator and is operable to store the plurality of parameter values.

9. A computer system for finite element analysis of an integrated chip package, comprising:

a parametric processor operable to acquire a plurality of parameter values for a plurality of parameters based on said integrated chip package, wherein the plurality of parameters define spacial relationships between a plurality of parts of the integrated chip package;

a volume generator coupled to the parametric processor and operable to generate a plurality of volume coordinates for a plurality of volumes associated with the plurality of parts of the integrated chip package by using the plurality of parameter values;

a mesh generator coupled to the volume generator and operable to subdivide the plurality of volumes into a plurality of elements; and a finite element analysis processor coupled to the mesh generator and operable to analyze a model of an integrated chip package by calculating an effect of stress on the plurality of elements;

a display coupled to the finite element analysis processor and operable to display a result from the finite element analysis processor, wherein the volume generator comprises:

a symmetry offset generator coupled to the parametric processor and operable to generate a symmetry offset, wherein the symmetry offset is generated using a model symmetry type acquired as a parameter value;

a volume coordinates generator coupled to the symmetry offset generator and operable to generate said plurality of volume coordinates for said plurality of volumes associated with a plurality of parts of the integrated chip package using the plurality of parameter values;

a volume coordinates tester coupled to the volume coordinates generator and operable to test the plurality of volume coordinates and to create a list of volume coordinates for passing volumes, wherein a volume is a passing volume if the volume is included within a portion of the integrated chip package to be modeled with the model symmetry type; and a storage device coupled to the volume coordinates generator and operable to store the list of volume coordinates for passing volumes.

10. A computer-implemented method for modeling an integrated chip package using a computer system, comprising the steps of:

processing parameters to acquire a plurality of parameter values for a plurality of parameters, wherein the plurality of parameters defines spacial relationships between a plurality of parts of the integrated chip package;

generating a symmetry offset, wherein the symmetry offset is generated using a model symmetry type acquired as a parameter value;

generating a plurality of pin volume coordinates for a plurality of volumes associated with a plurality of pins of the integrated chip package using the plurality of parameter values; and generating a plurality of component volume coordinates for a plurality of volumes associated with a plurality of components of the integrated chip package by using the plurality of parameter values to model the integrated chip package.

11. The computer-implemented method of claim 10, wherein the step of generating a symmetry offset comprises the steps of:

checking a model symmetry type acquired as a parameter value in the step of processing parameters; and generating a symmetry offset using the model symmetry type.

12. The computer-implemented method of claim 10, wherein the step of generating a plurality of pin volume coordinates comprises the steps of:

creating a plurality of pin volume coordinates for a plurality of volumes associated with a plurality of pins on a first side of a first axis of the integrated chip package, wherein a number of the plurality of pins is specified by one of the plurality of parameter values;

creating a plurality of pin volume coordinates for a plurality of volumes associated with a plurality of pins on a second side of a first axis of the integrated chip package, wherein a number of the plurality of pins is specified by one of the plurality of parameter values;

creating a plurality of pin volume coordinates for a plurality of volumes associated with a plurality of pins on a first side of a second axis of the integrated chip package, wherein a number of the plurality of pins is specified by one of the plurality of parameter values acquired from the user of the computer system; and creating a plurality of pin volume coordinates for a plurality of volumes associated with a plurality of pins on a second side of a second axis of the integrated chip package, wherein a number of the plurality of pins is specified by one of the plurality of parameter values.

13. The computer-implemented method of claim 12, wherein the steps of creating a plurality of pin volume coordinates comprise the steps of:

calculating a plurality of volume coordinates for a first volume associated with a bottom-most pin of a side of the integrated chip package;

testing the plurality of volume coordinates for the first volume and maintaining a list of volume coordinates for passing volumes, wherein a volume is a passing volume if the volume is included within a portion of the integrated chip package to be modeled with the model symmetry type;

repeating the steps of calculating and testing until a plurality of volume coordinates have been calculated for all volumes associated with the bottom-most pin;

recalculating a plurality of volume coordinates for a second volume associated with a next pin of the side of the integrated chip package if the side of the integrated chip package has more than one pin, wherein the step of recalculating is performed by incrementing the plurality of volume coordinates for the second volume associated with the bottom-most pin by one pin pitch dimension and wherein the pin pitch dimension is a parameter value;

testing the plurality of volume coordinates for the second volume and maintaining the list of volume coordinates for passing volumes, wherein a volume is a passing volume if the volume is included within a portion of the integrated chip package to be modeled with the model symmetry type;

repeating the steps of recalculating and testing until a plurality of volume coordinates have been calculated for all volumes within all pins on the side of the integrated chip package.

14. The computer-implemented method of claim 13, wherein the step of testing the plurality of volume coordinates for the first volume or the second volume comprises the steps of:

testing a plurality of volume coordinates for a volume by subtracting the symmetry offset from the plurality of volume coordinates;

setting every negative ordinate of the plurality of volume coordinates equal to zero; and adding the volume to a list of volume coordinates for passing volumes if the volume has a thickness in all directions greater than zero.

15. The computer-implemented method of claim 10, wherein the step of generating a plurality of component volume coordinates comprises the steps of:

creating a first plurality of volume coordinates for a plurality of volumes associated with a printed wiring board;

testing each of the first plurality of volume coordinates after each of the first plurality of volume coordinates is created and maintaining a list of volume coordinates for passing volumes, wherein a volume is a passing volume if the volume is included within a portion of the integrated chip package to be modeled with the model symmetry type;

creating a second plurality of volume coordinates for a plurality of volumes associated with a chip;

testing each of the second plurality of volume coordinates after each of the second plurality of volume coordinates is created and maintaining a list of volume coordinates for passing volumes, wherein a volume is a passing volume if the volume is included within a portion of the integrated chip package to be modeled with the model symmetry type;

creating a third plurality of volume coordinates for a plurality of volumes associated with a die attach;

testing each of the third plurality of volume coordinates after each of the third plurality of volume coordinates is created and maintaining a list of volume coordinates for passing volumes, wherein a volume is a passing volume if the volume is included within a portion of the integrated chip package to be modeled with the model symmetry type;

creating a fourth plurality of volume coordinates for a plurality of volumes associated with a pad;

testing each of the fourth plurality of volume coordinates after each of the fourth plurality of volume coordinates is created and maintaining a list of volume coordinates for passing volumes, wherein a volume is a passing volume if the volume is included within a portion of the integrated chip package to be modeled with the model symmetry type;

creating a fifth plurality of volume coordinates for a plurality of volumes associated with a plurality of tie straps;

testing each of the fifth plurality of volume coordinates after each of the fifth plurality of volume coordinates is created and maintaining a list of volume coordinates for passing volumes, wherein a volume is a passing volume if the volume is included within a portion of the integrated chip package to be modeled with the model symmetry type;

creating a sixth plurality of volume coordinates for a plurality of volumes associated with a mold compound; and testing each of the sixth plurality of volume coordinates after each of the sixth plurality of volume coordinates is created and maintaining a list of volume coordinates for passing volumes, wherein a volume is a passing volume if the volume is included within a portion of the integrated chip package to be modeled with the model symmetry type.

16. The computer-implemented method of claim 15, wherein the steps of testing comprise the steps of:

testing a plurality of volume coordinates for a volume by subtracting the symmetry offset from the plurality of volume coordinates;

setting every negative ordinate of the plurality of volume coordinates equal to zero; and adding the volume to a list of volume coordinates for passing volumes if the volume has a thickness in all directions greater than zero.

* * * * *